United States Patent
Bi et al.

(10) Patent No.: US 12,509,380 B2
(45) Date of Patent: Dec. 30, 2025

(54) METHOD FOR PHOSPHORUS REMOVAL AND RECOVERY USING ORGANIC CARBON SOURCE OF URBAN SEWAGE

(71) Applicant: SUZHOU UNIVERSITY OF SCIENCE AND TECHNOLOGY, Suzhou (CN)

(72) Inventors: Zhen Bi, Suzhou (CN); Yong Huang, Suzhou (CN); Yang Pan, Suzhou (CN); Xiang Li, Suzhou (CN)

(73) Assignee: SUZHOU UNIVERSITY OF SCIENCE AND TECHNOLOGY, Suzhou (CN)

( * ) Notice: Subject to any disclaimer, the term of this patent is extended or adjusted under 35 U.S.C. 154(b) by 459 days.

(21) Appl. No.: 18/011,121

(22) PCT Filed: Aug. 4, 2020

(86) PCT No.: PCT/CN2020/106692
§ 371 (c)(1),
(2) Date: Dec. 16, 2022

(87) PCT Pub. No.: WO2021/258505
PCT Pub. Date: Dec. 30, 2021

(65) Prior Publication Data
US 2023/0242427 A1 Aug. 3, 2023

(30) Foreign Application Priority Data
Jun. 23, 2020 (CN) .......................... 202010579041.6

(51) Int. Cl.
*C02F 3/30* (2023.01)
*C01B 25/00* (2006.01)
(Continued)

(52) U.S. Cl.
CPC ............ *C02F 3/301* (2013.01); *C01B 25/003* (2013.01); *C02F 3/1278* (2013.01); *C02F 3/308* (2013.01); *C02F 2101/105* (2013.01)

(58) Field of Classification Search
CPC .... C02F 3/301; C02F 3/308; C02F 2101/105; C02F 3/1278
(Continued)

(56) References Cited

U.S. PATENT DOCUMENTS 6,875,357 B1   4/2005   Mikkelson et al.

FOREIGN PATENT DOCUMENTS

AU   2003298143   6/2004
CN   101182075    5/2008
(Continued)

OTHER PUBLICATIONS

Pan et al., English machine translation, CN 107311308 A, pp. 1-5 (Year: 2017).*
(Continued)

*Primary Examiner* — Claire A Norris
(74) *Attorney, Agent, or Firm* — Workman Nydegger

(57) ABSTRACT

A method for phosphorus removal and recovery using an organic carbon source of urban sewage, including: first filling a biofilm reactor with sewage; stirring under anaerobic conditions, phosphorus being released from a polyphosphate biofilm using an organic carbon source in the sewage; discharging a portion of the sewage after the aforementioned treatment into a recovery tank and storing same as a recovery liquid; performing aerobic aeration on the remaining part of the sewage after anaerobic treatment, such that phosphorus is absorbed by the polyphosphate biofilm until the concentration of phosphorus reaches a requirement for discharge; turning off the aeration device and discharging the sewage; returning the recovery liquid to the biofilm reactor, (Continued)

simultaneously adding sewage to fill the reactor, and repeating the aforementioned steps multiple times; and obtaining a phosphorus recovery liquid when the concentration of phosphorus in the recovery liquid reaches the requirements for a phosphorus recovery process.

8 Claims, 1 Drawing Sheet

(51) Int. Cl.
*C02F 3/12* (2023.01)
*C02F 101/10* (2006.01)

(58) Field of Classification Search
USPC .......................................................... 210/605
See application file for complete search history.

(56) References Cited

FOREIGN PATENT DOCUMENTS

| | | |
|---|---|---|
| CN | 101654312 | 2/2010 |
| CN | 101891345 | 11/2010 |
| CN | 104944704 | 9/2015 |
| CN | 106565016 | 4/2017 |
| CN | 106565056 | 4/2017 |
| CN | 107311308 | 11/2017 |
| CN | 110668560 | 1/2020 |
| WO | 2004050949 | 6/2004 |

OTHER PUBLICATIONS

International Search Report for International Application No. PCT/cn2020/106692, mailed Mar. 22, 2021, 11 pages.

* cited by examiner

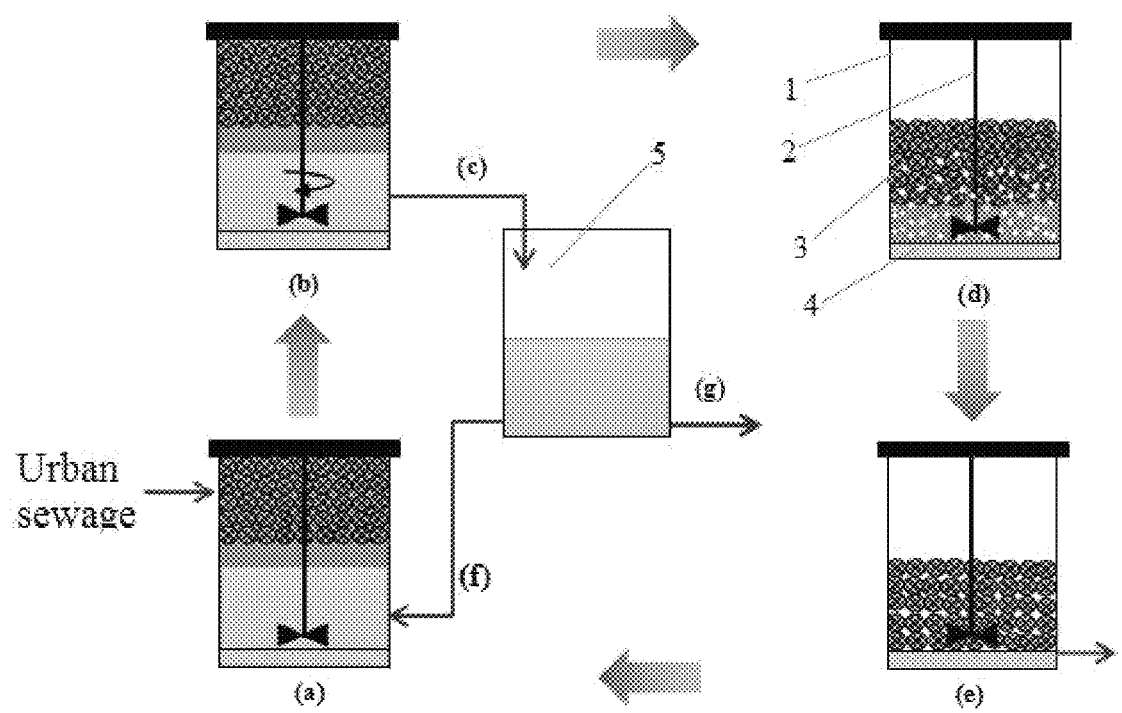

METHOD FOR PHOSPHORUS REMOVAL AND RECOVERY USING ORGANIC CARBON SOURCE OF URBAN SEWAGE

CROSS REFERENCE TO RELATED APPLICATIONS

The present application is a 371 of International Patent Application No. PCT/CN2020/106692, titled "METHOD FOR PHOSPHORUS REMOVAL AND RECOVERY USING ORGANIC CARBON SOURCE OF URBAN SEWAGE", filed on Aug. 4, 2020, which claims the benefit of and priority to Chinese Patent Application No. 202010579041.6, filed with the China National Intellectual Property Administration on Jun. 23, 2020, and titled with "METHOD FOR PHOSPHORUS REMOVAL AND RECOVERY USING ORGANIC CARBON SOURCE OF URBAN SEWAGE", which are hereby incorporated by reference in their entirety.

FIELD

The present invention relates to the field of sewage treatment, in particular to a method for phosphorus removal and recovery using an organic carbon source of urban sewage.

BACKGROUND

The contradiction between resource scarcity and environmental pollution is driving the rapid development of concepts and technologies of phosphorus recovery. Urban sewage, as the main substrate for phosphorus recovery, has a phosphorus content that can meet 15-20% of needs for phosphorus by human. At present, the phosphorus recovery projects of domestic and foreign urban sewage plants mainly focus on the residual sludge of the enhanced biological phosphorus removal (EBPR) process, in which phosphorus is enriched from sludge concentrated fermentation supernatant and dewatering effluent, and then phosphorus is recovered through multi-step extraction. The phosphorus recovery process based on EBPR generally has the problems of large organic carbon consumption, low phosphorus recovery rate, complex recovery process and large sludge yield.

In the prior art, the technology of phosphorus recovery by biofilm is to utilize the phosphorus uptake and phosphorus release functions of the phosphorus-accumulating biofilm under the alternating environment of aerobic and anaerobic conditions to achieve the removal and enrichment of orthophosphate, and to obtain a phosphorus concentrated solution. In the biofilm method, the removal and enrichment of phosphorus are combined, and only the carbon source required for the growth of phosphorus-accumulating microorganisms (PAOs) needs to be met. Compared with the traditional EBPR phosphorus recovery process, in the biofilm method, the removal and recovery of phosphorus in the mainstream process can be completed simultaneously, in which the removed phosphorus directly enters the concentrated solution for recovery, avoiding the loss of phosphorus in the recovery process and simplifying the recovery steps. Due to the features of low carbon source demand and high phosphorus recovery efficiency, biofilm method has great application prospect to recovery phosphorus from sewage containing low-phosphorus and low-carbon.

In the current process of phosphorus recovery by biofilm, the mode of "aerobic treatment first, then anaerobic treatment" is adopted, i.e., after the wastewater steam entering the master reactor, the phosphorus is first transferred from the liquid phase to the biofilm through phosphorus uptake by PAOs under aerobic condition, and the treated water is discharged from the system. In the subsequent anaerobic treatment, the biologically captured phosphorus is released into a smaller recovery steam, meanwhile external concentrated carbon source is added to facilitate phosphorus release; then the recovery steam is discharged and collected in a separate tank. As the master reactor alternately exposes to a wastewater stream and a separate recirculated recovery stream, the phosphorus concentration in the recovery solution increases continuously, which stresses the phosphorus release by phosphorus-accumulating biofilm and results in a limitation on the phosphorus concentration in recovery solution. In addition, because in this process mode, the organic carbon in wastewater is oxidized and consumed in the aerobic stage, it is necessary to add an external concentrated carbon source (COD concentration ranges from hundreds to thousands of milligrams per liter) to facilitate phosphorus release by PAOs in the following anaerobic stage.

In summary, it is necessary to develop a new process mode of phosphorus recovery by biofilm, and to enrich the phosphate salt with a content of only a few milligrams per liter in urban sewage to a higher concentration level that meets the requirement for phosphorus recovery at the cost of the least carbon source consumption. The concentration of organic carbon source in urban sewage in China is generally in the range of about 150-400 mg/L (in COD), so this part of organic carbon can be directly used for phosphorus recovery by biofilm, which can not only greatly reduce the amount of the carbon source added in the phosphorus recovery process, but also utilize the organic carbon in-situ.

SUMMARY

In view of this, the purpose of the present invention is to provide a method for phosphorus removal and recovery utilizing the organic carbon in urban sewage.

In order to achieve the above purpose, the technical solution adopted in the present invention is as follows:

A method for phosphorus removal and recovery using an organic carbon source of urban sewage, comprising a biofilm reactor containing a phosphorus-accumulating biofilm, an aeration device arranged in the biofilm reactor and a recovery tank, and comprising the following steps:
   (a) adding sewage to the biofilm reactor until the biofilm reactor is full;
   (b) stirring the sewage under anaerobic condition, so that phosphorus is released from the phosphorus-accumulating biofilm by utilizing an organic carbon source in the sewage;
   (c) discharging a portion of the sewage after being treated in step (b) into the recovery tank and storing as a recovery solution;
   (d) turning on the aeration device to perform an aerobic aeration treatment on the remaining portion of the sewage after being treated in step (b) in the biofilm reactor, such that phosphorus therein is uptaken by the phosphorus-accumulating biofilm until the concentration of phosphorus meets the discharge standard;
   (e) turning off the aeration device, and discharging all the sewage after being treated in step (d);
   (f) recirculating the recovery solution to the biofilm reactor, starting a new cycle from step (a); and obtaining a phosphorus recovery solution when the concentration of phosphorus in the recovery solution meets the requirements for a phosphorus recovery process;

wherein, steps (a)-(f) constitute an operation cycle, during which the sewage treated by the biofilm reactor in step (d) in each operation cycle is continuously discharged, and after a plurality of operation cycles, a phosphorus recovery solution in which the concentration of phosphorus meets the requirements for a phosphorus recovery process is obtained; up to which point a phosphorus concentration cycle is reached.

Specifically, the volume ratio of the recovery solution returned to the biofilm reactor in step (f) in the previous operation cycle to the sewage entering the biofilm reactor in step (a) of the following cycle is 1:1-2.5.

Specifically, after a plurality of operation cycles, the phosphorus recovery solution meets the requirements for a phosphorus recovery process, such that a batch of phosphorus recovery solution is obtained. The phosphorus recovery solution can be used for phosphorus recovery, production and manufacture of phosphorus products by using various existing chemical crystallization phosphorus recovery methods; then fresh sewage is added into the biofilm reactor, and a new operation cycle is started from step (a).

Specifically, after a plurality of operation cycles of steps (a)-(f), the concentration of phosphorus meets the requirements for a phosphorus recovery process, such that a batch of phosphorus recovery solution is obtained, up to which point a phosphorus concentration cycle is reached, and then the phosphorus concentration cycle is repeated to continuously process the sewage.

Specifically, when step (a) is repeated, fresh sewage is added, and there is no need to add an additional new organic carbon source.

Specifically, the concentration of the organic carbon source in the urban sewage is 150-400 mg/L.

Specifically, in step (b), the duration of the treatment of stirring under an anaerobic condition is 2-12 h.

Specifically, in step (d), in the aerobic aeration treatment, the duration of the treatment is 2-12 h, and the concentration of dissolved oxygen is <8 mg/L.

Compared with the prior art, the present invention provides a method for phosphorus removal and recovery in a biofilm reactor by utilizing the organic carbon source in urban sewage, wherein the phosphorus in the sewage is effectively removed by using the organic carbon source contained in the urban sewage in a biofilm reactor, completely without external addition of organic carbon source, and all the phosphorus removed from the urban sewage enters the phosphorus recovery solution to realize the simultaneous removal and recovery of phosphorus. Meanwhile, the obtained phosphorus recovery solution can be used for production and manufacture of phosphorus product by using various existing chemical crystallization phosphorus recovery methods. In addition, the organic carbon source in the sewage is utilized in-situ, greatly reducing the cost of adding carbon source in the phosphorus recovery process.

BRIEF DESCRIPTION OF DRAWINGS

In order to explain the embodiments of the present invention or the technical solutions in the prior art more clearly, the following briefly introduces the drawings that need to be used in the description of the embodiments or the prior art. Obviously, the drawings in the following description are only some embodiments of the present invention. For those of ordinary skill in the art, other drawings can also be obtained according to these drawings without creative efforts.

FIG. 1 is a schematic flow chart of the present invention.

Reference numerals and component descriptions involved in the drawings are as follows: 1. Biofilm reactor; 2. Stirring device; 3. Phosphorus-accumulating biofilm suspending filler carriers; 4. Aeration device; 5. Recovery tank.

DETAILED DESCRIPTION

The concentration of organic carbon source (COD) in urban sewage in China is generally in the range of about 150-400 mg/L, and the concentration of phosphorus is 3-8 mg/L. The present invention provides a method for synchronously removing and recovering phosphorus, wherein the organic carbon source in the urban sewage can be directly used for the phosphorus recovery by biofilm, greatly reducing the amount of carbon source added in the phosphorus recovery process, and simultaneously utilizing the organic carbon source in-situ, which is energy-saving, environmentally-friendly and convenient. The sewage referred to in the present invention is all urban sewage.

The technical solutions of the present invention will be described clearly and in detail below through specific embodiments. Obviously, the described embodiments are only some, but not all embodiments of the present invention. Based on the embodiments of the present invention, all other embodiments obtained by those of ordinary skill in the art without creative efforts shall fall within the protection scope of the present invention.

A method for phosphorus removal and recovery using an organic carbon source of urban sewage, as shown in FIG. 1, is a continuous operation process, and the devices involved are: a biofilm reactor 1 containing a phosphorus-accumulating biofilm, a stirring device 2 arranged in the biofilm reactor 1, a phosphorus-accumulating biofilm suspending filler carrier 3, an aeration device 4 arranged in the biofilm reactor 1 and a recovery tank 5.

In the present invention, the biofilm reactor for treating urban sewage is not particularly limited, and a biofilm reactor well known to those skilled in the art that can be used for sewage treatment by sequencing batch biofilm method can be adopted.

The method for producing the phosphorus-accumulating biofilm is not limited, and any common method in the prior art can be used, as long as the culture of the phosphorus-accumulating biofilm can be realized. The following is an example of a culture method, comprising: mixing an activated sludge with a suspending filler carrier, then through the alternative treatment of anaerobic stirring and aerobic aeration, the phosphorus-accumulating organisms attaching to the surface of the suspending filler carrier to form the phosphorus-accumulating biofilm suspending filler carrier 3.

In order to make the removal and recovery of phosphorus more complete, a stirring device 2 is also arranged in the biofilm reactor 1, so as to enhance the mass transfer effect between the urban sewage and the phosphorus-accumulating biofilm on the surface of the suspending filler carrier 3, thereby maximizing the effect of the phosphorus-accumulating biofilm.

The present invention provides a method for phosphorus removal and recovery using an organic carbon source of urban sewage, comprising the following steps:

(a) adding sewage to the biofilm reactor 1 until the biofilm reactor 1 is full;

(b) stirring the sewage under an anaerobic condition for 2-12 h, so that phosphorus is released from the phosphorus-accumulating biofilm by using an organic carbon source in the sewage;

(c) discharging a portion of the sewage after being treated in step (b) into a recovery tank and storing same as a recovery solution;

(d) turning on an aeration device to perform an aerobic aeration treatment on the remaining portion of the sewage after being treated in step (b) in the biofilm reactor for 2-12 hours, wherein the concentration of dissolved oxygen is less than 8 mg/L, such that phosphorus therein is absorbed by the phosphorus-accumulating biofilm until the concentration of phosphorus meets the discharge standard (the concentration of phosphorus <0.5 mg/L);

(e) turning off the aeration device, and discharging the sewage after being treated in step (d);

(f) returning the recovery solution to the biofilm reactor, starting a new cycle from step (a), and obtaining a phosphorus recovery solution when the concentration of phosphorus in the recovery solution meets the requirements for a phosphorus recovery process.

The concentration of the organic carbon source in the urban sewage of the present invention is 150-400 mg/L.

Steps (a)-(f) are one operation cycle, during which the sewage treated by the biofilm reactor in step (d) in each operation cycle is continuously discharged. After a plurality of operation cycles, the concentration of phosphorus in the recovery solution meets the requirements for a phosphorus recovery process, such that a batch of phosphorus recovery solution is obtained, up to which point a phosphorus concentration cycle is reached. At this time, the concentration of phosphorus in the phosphorus recovery solution is relatively high, and the phosphorus recovery solution can be used for phosphorus recovery, production and manufacture of phosphorus product by using various existing chemical crystallization phosphorus recovery methods. Then fresh sewage is added into the biofilm reactor, and a new operation cycle is started from step (a). At this time, when step (a) is repeated, fresh sewage is added, and there is no need to add an additional new organic carbon source, in which way the removal and recovery of phosphorus in the urban sewage can be realized, greatly improving the treatment efficiency and saving time.

After a plurality of operation cycles of steps (a)-(f), the concentration of phosphorus meets the requirements for a phosphorus recovery process, such that a batch of phosphorus recovery solution is obtained, up to which point a phosphorus concentration cycle is reached, and then the phosphorus concentration cycle is repeated to continuously process the sewage.

The volume ratio of the recovery solution returned to the biofilm reactor in step (f) in the previous operation cycle to the sewage entering the biofilm reactor in step (a) in the next operation cycle is 1:1-2.5. Reasonably setting the volume ratio of the recovery solution to the added sewage aims to enable the organic carbon source in the sewage to be fully used for phosphorus removal and recovery, and to increase the phosphorus concentration in the recovery solution.

The temperature and pH value in the biofilm reactor 1 of the present invention do not need to be manually adjusted, thereby greatly reducing manpower and showing high application value.

Examples will be given below to more fully illustrate the technical solutions of the present application.

Example 1

The concentration of COD in urban sewage was 150 mg/L. The urban sewage in this example was subjected to phosphorus removal and recovery by the method for phosphorus removal and recovery using an organic carbon source of urban sewage as described above in the present invention, so that the concentration of phosphorus in the recovery solution exceeded 150 mg/L, wherein the volume ratio of the recovery solution returned to the biofilm reactor in step (f) in the previous operation cycle to the sewage entering the biofilm reactor in step (a) in the next operation cycle was 1:2.0-2.5, the duration of the anaerobic stirring in step (b) was 8-12 h, and the duration of the aerobic aeration treatment in step (d) was 8-12 h.

Example 2

The concentration of COD in urban sewage was 300 mg/L. The urban sewage in this example was subjected to phosphorus removal and recovery by the method for phosphorus removal and recovery using an organic carbon source of urban sewage as described above in the present invention, so that the concentration of phosphorus in the recovery solution exceeded 150 mg/L, wherein the volume ratio of the recovery solution returned to the biofilm reactor in step (f) in the previous operation cycle to the sewage entering the biofilm reactor in step (a) in the next operation cycle was 1:1.5-2.0, the duration of the anaerobic stirring in step (b) was 6-10 h, and the duration of the aerobic aeration treatment in step (d) was 6-10 h.

Example 3

The concentration of COD in urban sewage was 400 mg/L. The urban sewage in this example was subjected to phosphorus removal and recovery by the method for phosphorus removal and recovery using an organic carbon source of urban sewage as described above in the present invention, so that the concentration of phosphorus in the recovery solution exceeded 150 mg/L, wherein the volume ratio of the recovery solution returned to the biofilm reactor in step (f) in the previous operation cycle to the sewage entering the biofilm reactor in step (a) in the next operation cycle was 1:1.0-1.5, the duration of the anaerobic stirring in step (b) was 2-6 h, and the duration of the aerobic aeration treatment in step (d) was 2-6 h.

In the above examples, the duration of the anaerobic stirring in step (b) and the duration of the aerobic aeration treatment in step (d) were both the duration used in a single operation cycle. It can be seen from Examples 1-3 that for urban sewage with a high concentration of COD, the volume ratio of the sewage entering the biofilm reactor in step (a) can be correspondingly low, and the duration of the anaerobic stirring treatment and the aerobic aeration treatment can also be shortened appropriately. For urban sewage with a low concentration of COD, in order to achieve good effect of phosphorus removal and recovery, the volume ratio of the sewage entering the biofilm reactor in step (a) should be high, and the duration of the anaerobic stirring treatment and the aerobic aeration treatment should be prolonged appropriately.

In the present invention, phosphorus in the sewage is effectively removed by using an organic carbon source contained in urban sewage, and there is no need to add external organic carbon source at all, in which all the phosphorus removed from the urban sewage enters the phosphorus recovery solution, thereby realizing the removal and recovery of phosphorus simultaneously. Meanwhile, the obtained phosphorus recovery solution can be used for production and manufacture of phosphorus product by using various existing chemical crystallization phosphorus recovery methods. In addition, the organic carbon source in the sewage is utilized in-situ, greatly reducing the cost of adding carbon source in the phosphorus recovery process.

The above description of the disclosed examples enables those skilled in the art to realize or use the present invention. Various modifications to these examples will be readily apparent to those skilled in the art, and the generic principles defined herein may be implemented in other examples without departing from the spirit or scope of the present invention. Thus, the present invention is not intended to be limited to the examples shown herein, but is to be accorded the widest scope consistent with the principles and novel features disclosed herein.

The invention claimed is:

1. A method for phosphorus removal and recovery using an organic carbon source of urban sewage, by means of a biofilm reactor containing a phosphorus-accumulating biofilm, an aeration device arranged in the biofilm reactor and a recovery tank, the method comprising the following steps:
   (a) adding urban sewage to the biofilm reactor until the biofilm reactor is full;
   (b) stirring the urban sewage under anaerobic condition, so that phosphorus is released from the phosphorus-accumulating biofilm by utilizing an organic carbon source in the urban sewage;
   (c) discharging a portion of the urban sewage after being treated in step (b) into the recovery tank and storing as a recovery solution;
   (d) turning on the aeration device to perform an aerobic aeration treatment on the remaining portion of the urban sewage after being treated in step (b) in the biofilm reactor, such that phosphorus therein is taken up by the phosphorus-accumulating biofilm until the concentration of phosphorus meets the discharge standard;
   (e) turning off the aeration device, and discharging all the urban sewage during and after being treated in step (d);
   (f) recirculating the recovery solution to the biofilm reactor, starting a new cycle from step (a); and obtaining a phosphorus recovery solution of a plurality of phosphorus recovery solutions when the concentration of phosphorus in the recovery solution meets requirements for a phosphorus recovery process;
   wherein, steps (a)-(f) constitute an operation cycle, during which the urban sewage treated by the biofilm reactor in step (d) in each operation cycle is continuously discharged; and after a plurality of operation cycles, the plurality of phosphorus recovery solutions in which the concentration of phosphorus meets the requirements for a phosphorus recovery process are obtained; at which point a phosphorus concentration cycle is reached.

2. The method for phosphorus removal and recovery using an organic carbon source of urban sewage according to claim 1, wherein the volume ratio of the recovery solution returned to the biofilm reactor in step (f) in the previous operation cycle to the urban sewage entering the biofilm reactor in step (a) of the following cycle is 1:1-2.5.

3. The method for phosphorus removal and recovery using an organic carbon source of urban sewage according to claim 1, wherein after a plurality of operation cycles, the phosphorus recovery solution meets the requirements for a phosphorus recovery process, such that the plurality of phosphorus recovery solutions are obtained, the phosphorus recovery solutions can be used for phosphorus recovery, production and manufacture of phosphorus product by using various existing chemical crystallization phosphorus recovery methods, then fresh urban sewage is added into the biofilm reactor, and a new operation cycle is started from step (a).

4. The method for phosphorus removal and recovery using an organic carbon source of urban sewage according to claim 1, wherein after a plurality of operation cycles of steps (a)-(f), the concentration of phosphorus meets the requirements for a phosphorus recovery process, such that the plurality of phosphorus recovery solutions are obtained, at which point the phosphorus concentration cycle is reached, and then the phosphorus concentration cycle is repeated to continuously process the urban sewage.

5. The method for phosphorus removal and recovery using an organic carbon source of urban sewage according to claim 1, wherein when step (a) is repeated, fresh urban sewage is added, and there is no need to add an additional new organic carbon source.

6. The method for phosphorus removal and recovery using an organic carbon source of urban sewage according to claim 1, wherein the concentration of the organic carbon source in the urban sewage is 150-400 mg/L.

7. The method for phosphorus removal and recovery using an organic carbon source of urban sewage according to claim 1, wherein in step (b), the duration of the treatment of stirring under an anaerobic condition is 2-12 h.

8. The method for phosphorus removal and recovery using an organic carbon source of urban sewage according to claim 1, wherein in step (d), in the aerobic aeration treatment, the duration of the treatment is 2-12 h, and the concentration of dissolved oxygen is <8 mg/L.

* * * * *